(No Model.)

J. L. BARNES.
ADJUSTABLE CARTRIDGE CAPPER AND DECAPPER.

No. 600,706. Patented Mar. 15, 1898.

WITNESSES.
V. S. Wheeler
Frank Avery

INVENTOR.
John L. Barnes
L. H. Bradford
Attorney.

UNITED STATES PATENT OFFICE.

JOHN L. BARNES, OF GOSHEN, MISSOURI.

ADJUSTABLE CARTRIDGE CAPPER AND DECAPPER.

SPECIFICATION forming part of Letters Patent No. 600,706, dated March 15, 1898.

Application filed July 24, 1897. Serial No. 645,813. (No model.)

*To all whom it may concern:*

Be it known that I, JOHN L. BARNES, a citizen of the United States, residing at Goshen, in the county of Harrison and State of Missouri, have invented certain new and useful Improvements in Decappers and Recappers; and I do hereby declare the following to be a full, clear, and exact description of the invention, such as will enable others skilled in the art to which it appertains to make and use the same, reference being had to the accompanying drawings, forming a part of this specification.

This invention relates to new and useful improvements in decappers and recappers of cartridge-shells; and it consists in the construction and formation of the tool, as hereinafter fully set forth, and pointed out particularly in the claims.

The object of the invention is to provide a device of the character set forth that shall be cheap and simple of construction and one which shall be convenient and perfect in operation, which object is attained by the construction illustrated in the accompanying drawings, in which—

Figure 1:
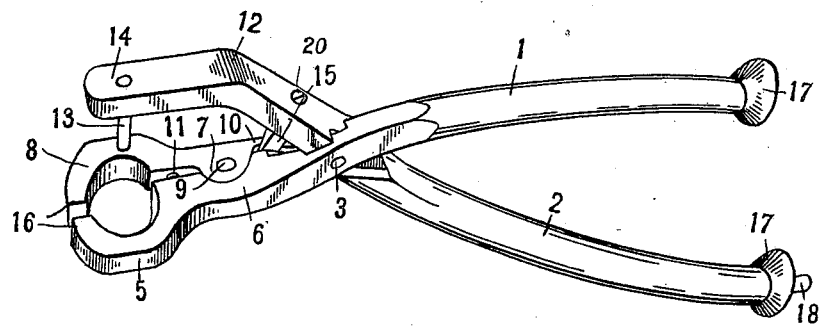
Figure 2:
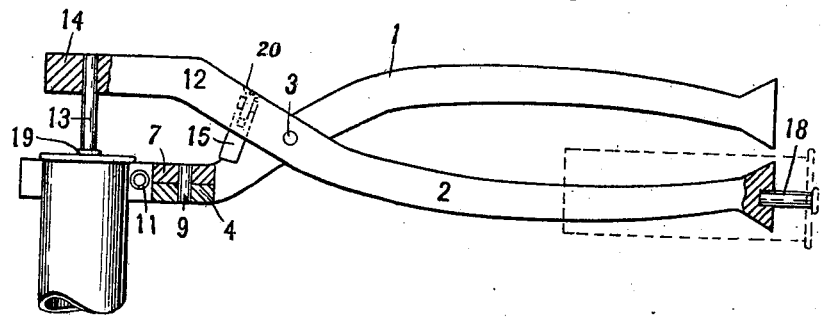
Figure 3:
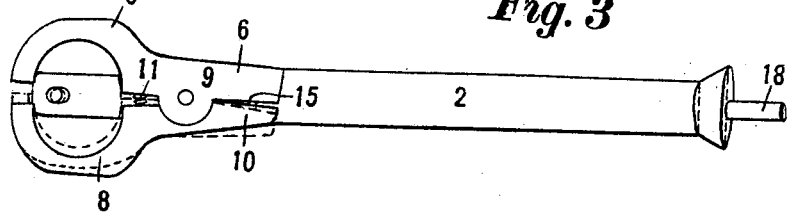

Figure 1 is a general perspective view of my improved cartridge implement. Fig. 2 is a side elevation of Fig. 1, some of the parts being in section. Fig. 3 is a bottom plan of Fig. 1.

This cartridge implement consists, primarily, of members 1 and 2, which have contiguous sides provided with triangular recesses which allow said members to interlock, and being pivoted at 3 are capable of operation similar to that of a pair of scissors.

The forward end of member 1 is slightly bent at 4, and its outer end terminates in a U-shaped head-section 5. The body portion 6 of handle or member 1 is provided with a circular recess to receive the ear 7, formed upon the head, which is pivoted by means of a suitable rivet 9. The rear end of said head portion 8 terminates in a tailpiece 10, which extends along the side of body 6, as shown in Fig. 1.

Extending between head-sections 5 and 8 is a coiled spring 11, the tension of which is such as to cause said sections 5 and 8 to stand apart and consequently tailpiece 10 to bear against body 6.

The forward end of handle or member 2 is slightly bent at 12, so that its outer extremity will extend approximately parallel with the implement head, composed of said portions 5 and 8. 13 designates a steel tooth which is set in portion 14 of handle 2 in such position as to extend directly downward toward the center of the circular opening formed by the union of said parts 5 and 8.

Extending downward from the under side of handle 1 is a wedge 15, which is adapted to crowd between tailpiece 10 and body 6 as handles 1 and 2 are forced together to throw the outer ends 16 of head portions 5 and 8 together, for a purpose hereinafter referred to.

The rear ends of handles 1 and 2 are provided with conical enlargements 17, and projecting from the center of the cone at the end of handle 2 is a spur 18.

In removing a cap handle 2 is passed longitudinally into the shell in which it is contained, the cone at its rear end directing spur 18 through the center thereof and in such position as to come squarely in contact with the inner side of said cap, when by continued pressure said cap may be forced outward, as will be readily understood and as clearly shown in Fig. 2.

When desired to recap a shell, such shell is placed with its open end downward upon a table and the cap inserted in the aperture in the end thereof. The opening formed by U-shaped head-sections 5 and 8 is then passed over the head end thereof until the proper position is reached, when the handles 1 and 2 are compressed, forcing end 14 of handle 2 downward toward head-sections 5 and 8, and as said end approaches said head-sections wedge 15 is forced between tailpiece 10 and body 6, thus throwing head-section 8 inward toward section 5 and firmly gripping and centering the cartridge-shell so tooth 13 will come in direct contact with the cap represented at 19, so that it may be pressed into the head of the shell to the required extent. Upon releasing handles 1 and 2 they will be thrown apart by the action of spring 11. As said handles are separated and the wedge removed the outer free end of head-section 8 is removed at some distance from head-section 5, and consequently increasing the diameter of the opening therebetween, so that the shell may be easily extracted.

It will be obvious that any size of cartridge-shell may be handled in this device by providing the wedge 15 with the adjusting means consisting of the screw 20, which is arranged to engage therewith to lengthen or shorten the wedge, as the case may demand. Thus should it be desired to cap a larger cartridge the adjusting-screw 20 is turned to shorten the wedge to the desired length, thus permitting the members to be brought together to their proper operating position just at the time the jaws are closed upon the shell.

Having thus fully set forth my invention, what I claim as new, and desire to secure by Letters Patent, is—

1. A cartridge implement, consisting of handles 1 and 2 pivoted at 3, the short ends of said handles being bent so as to stand approximately parallel with each other, one of said handles having a tooth projecting from its under side, the other of said handles having a U-shaped head and a corresponding portion pivoted thereto, said corresponding portion adapted to approach said U-shaped head, as said handles are closed, and to retract as they are opened, substantially as shown and described.

2. A cartridge implement, consisting of handles 1 and 2 pivoted together in angled recesses at 3, the short ends of said handles being slightly bent so as to extend approximately parallel with each other, one of said handles having a tooth 13 projecting from its under side, the other of said handles having a U-shaped head portion 5 formed integral therewith, and a corresponding head portion 8 pivoted at 9 thereto, the tailpiece projecting from said head portion 8, the wedge-shaped projection extending from said handle 2 so as to enter between said tailpiece and a portion of handle 1, the coiled spring adapted to exert an outward pressure between head-sections 5 and 8, and the spur projecting from the rear end of one of said handles, all substantially as shown and described, for the purpose set forth.

3. A cartridge implement, consisting of handles 1 and 2 pivoted together in angled recesses at 3, the short ends of said handles being slightly bent so as to extend approximately parallel with each other, one of said handles having a tooth 13 projecting from its under side, the other of said handles having a U-shaped head portion 5 formed integral therewith, and the corresponding head portion 8 pivoted at 9 thereto, the tailpiece projecting from said head portion 8, the wedge-shaped projection extending from said handle 1, so as to enter between said tailpiece and a portion of handle 1, the adjusting-screw 20 adapted to operate said wedge-shaped portion, whereby it is lengthened and shortened, the coiled spring adapted to exert an outward pressure between head-sections 5 and 8 and the spur projecting from the rear end of one of said handles, all substantially as shown and described, for the purpose set forth.

In testimony whereof I affix my signature in presence of two witnesses.

JOHN L. BARNES.

Witnesses:
H. T. ROGERS,
C. B. WOODWARD.